US010934442B2

(12) United States Patent
Zong et al.

(10) Patent No.: US 10,934,442 B2
(45) Date of Patent: Mar. 2, 2021

(54) METAL COMPLEXES

(71) Applicant: Agency for Science, Technology and Research, Singapore (SG)

(72) Inventors: Yun Zong, Singapore (SG); Xu Li, Singapore (SG); T.S. Andy Hor, Singapore (SG); Regina Lum, Singapore (SG); Yu Yuan Chieng, Singapore (SG)

(73) Assignee: Agency for Science, Technology and Research, Singapore (SG)

( * ) Notice: Subject to any disclaimer, the term of this patent is extended or adjusted under 35 U.S.C. 154(b) by 494 days.

(21) Appl. No.: 15/317,807

(22) PCT Filed: Jun. 9, 2015

(86) PCT No.: PCT/SG2015/050149
§ 371 (c)(1),
(2) Date: Dec. 9, 2016

(87) PCT Pub. No.: WO2015/191004
PCT Pub. Date: Dec. 17, 2015

(65) Prior Publication Data
US 2017/0130077 A1 May 11, 2017

(30) Foreign Application Priority Data

Jun. 9, 2014 (SG) .......................... 10201403051Y

(51) Int. Cl.
*C09D 7/48* (2018.01)
*C09D 5/32* (2006.01)
(Continued)

(52) U.S. Cl.
CPC ............... *C09D 7/48* (2018.01); *B05D 3/007* (2013.01); *C09D 5/32* (2013.01); *C09D 129/04* (2013.01); *C08K 5/0091* (2013.01)

(58) Field of Classification Search
CPC ....................................................... C09D 7/48
See application file for complete search history.

(56) References Cited

U.S. PATENT DOCUMENTS 2,927,021 A * 3/1960 Sorkin .................... G03F 7/038
430/306
3,620,735 A * 11/1971 Ulano ..................... G03F 7/038
430/270.1

(Continued)

FOREIGN PATENT DOCUMENTS

GB            935428 A      8/1963
WO    WO-93/010753 A1      6/1993

(Continued)

OTHER PUBLICATIONS

International Search Report for PCT/SG2015/050149, 5 pages (dated Aug. 6, 2015).

(Continued)

*Primary Examiner* — Peter F Godenschwager
(74) *Attorney, Agent, or Firm* — Choate, Hall & Stewart LLP; Charles E. Lyon; Kristen C. Buteau

(57) ABSTRACT

The present invention provides a coating composition comprising a) a metal complex comprising an organic acid or anion thereof coordinated to a metal ion; and b) a polymer, wherein there is no covalent bond between said metal complex and the polymer.

23 Claims, 11 Drawing Sheets

(51) Int. Cl.
*B05D 3/00* (2006.01)
*C09D 129/04* (2006.01)
*C08K 5/00* (2006.01)

(56) References Cited

U.S. PATENT DOCUMENTS

| | | | |
|---|---|---|---|
| 4,495,327 | A | 1/1985 | Schenck et al. |
| 4,729,791 | A | 3/1988 | Laura et al. |
| 4,829,046 | A | 5/1989 | Whitcomb |
| 5,415,690 | A | 5/1995 | Watanabe |

FOREIGN PATENT DOCUMENTS

| | | |
|---|---|---|
| WO | WO-00/08933 A1 | 2/2000 |
| WO | WO-02/085992 A1 | 10/2002 |
| WO | WO-2003/093384 A1 | 11/2003 |
| WO | WO-2011/098583 A1 | 8/2011 |

OTHER PUBLICATIONS

Written Opinion for PCT/SG2015/050149, 5 pages (dated Aug. 6, 2015).

\* cited by examiner

METAL COMPLEXES

CROSS REFERENCE TO RELATED APPLICATIONS

This patent application is a National Stage Entry of International Patent Application No. PCT/SG2015/050149, entitled "METAL COMPLEXES", and filed on Jun. 9, 2015, which claims the benefit of priority of Singapore patent application No. 10201403051Y, filed 9 Jun. 2014, the contents of each of which are hereby incorporated by reference in their entirety for all purposes herein.

FIELD OF THE INVENTION

The present invention relates to the field of metal complexes for use in coating compositions.

BACKGROUND OF THE INVENTION

Excessive exposure to UV radiation is known to have adverse effects on materials, environment and health. Plastics, polymers, wood etc. may undergo photodegradation by UV light, resulting in discolouration, loss of mechanical integrity, impact resistance and strength.

UV blocking compounds in materials currently in use include inorganic and organic compounds. Although they are in many cases effective in blocking UV radiation, several disadvantages persist with these compounds. Through the absorption of UV radiation, inorganic oxides can produce oxidizing radicals (.OH and $O_2^-$.) and hydrogen peroxide, which can in turn promote photo-oxidative degradation of materials. In addition, modifications to the UV blocking compounds may be required to ensure good dispersion. Further, many dispersions of UV blocking compounds have an opaque white appearance which may render them unacceptable for certain food packaging and other applications. Certain organic UV blocking compounds can also undergo photodegradation to generate free radicals when they absorb UV radiation. These radicals can damage a substrate on which the UV blocking compounds are disposed.

There is therefore a need for a UV blocking compound with effective blocking properties across a wide range of UV wavelengths. The compound is preferably readily dispersible in film forming materials. The resulting films are preferably transparent to visible light.

OBJECT OF THE INVENTION

It is an object of the present invention to at least partially satisfy the above need. It is a further object to at least partially overcome, or at least ameliorate, one or more of the above disadvantages of prior art materials.

SUMMARY

In a first aspect, there is provided a coating composition comprising a metal complex comprising an organic acid or anion thereof coordinated to a metal ion; and a polymer. There may be no covalent bond between said metal complex and the polymer. In the present context, the term "metal complex" should be understood to include salts of a metal ion.

The following options may be used in conjunction with the first aspect, either individually or in any suitable combination.

In some embodiments the metal complex and the polymer are both in solution in a solvent. This solvent may be aqueous. It may contain no organic solvent. In other embodiments, the coating composition of the aspect described above comprises less than about 1% solvent by weight. The metal complex and the polymer may be distributed substantially homogenously through the composition.

The metal of the metal complex may be a group 8 element, or may be a group 9 element or may be a group 10 element. In particular, the metal may be iron, nickel, cobalt or ruthenium. Optionally, the metal is iron. The oxidation state of the metal may be 3+.

The organic acid or anion thereof may be a carboxylic acid or anion thereof. It may comprise a second functional group coordinated with the metal ion. This second functional group may be for example a carboxyl group, or a hydroxyl group or a thiol group or may be an anion of any one of these. The organic acid, or anion thereof, may for example be a dicarboxylic acid, or a mono- or dianion thereof, or a tricarboxylic acid, or a mono-, di- or trianion thereof. In particular, the organic acid, or anion thereof, may be oxalic acid, malonic acid, succinic acid, glutaric acid, malic acid, tartaric acid, glycolic acid, lactic acid, citric acid, isocitric acid and aconitic acid or a corresponding anion or dianion of any one of these. The organic acid, or anion thereof, may comprise 2-8 carbon atoms, optionally 2-6 carbon atoms. The metal ion may have no carbene ligand coupled, optionally complexed, thereto.

The content of the metal ion in the coating composition may be in the range of about 0.0005 wt % to about 10.0 wt %. The polymer used in the coating composition may be a water soluble polymer. A non-terminal monomer unit of the polymer may comprise a hydroxyl group. In particular, the polymer may be polyvinyl alcohol, a partially hydrolyzed polyvinyl alcohol ester or a derivative or copolymer thereof. It may be a blend of any two or more of these.

The ratio of polymer to the metal may be in the range of 40:1 to 2:1. The coating composition may have the ability to absorb light in the UV range. In particular, the metal complex may have this ability. The ratio of blocked radiation to incident radiation for a thickness of 100 microns of the composition, optionally for a thickness of 50, 20 or 10 microns thereof, may be no less than 90% (or no less than 95 or 99%) for any wavelength in the UVA range, or in the UVB range, or in the UVC range, or in any two, optionally all of these ranges. The ratio of transmitted light intensity to incident light intensity for a thickness of 100 microns of the composition, optionally for a thickness of 50, 20 or 10 microns thereof, may be no greater than about 10%, or 5, 2 or 1%, for any wavelength in the UVA range, or in the UVB range, or in the UVC range, or in any two, optionally all of these ranges. For these UV wavelengths, the metal complex may have a molar extinction coefficient of at least about $10^5$ $M^{-1}m^{-1}$, or at least about $5*10^5$ or at least about $10^6$ or at least about $5*10^6$ or at least about $10^7$.

The coating composition may be substantially transparent to visible light. For example the ratio of transmitted light intensity to incident light intensity for a thickness of 100 microns of the composition, optionally for a thickness of 50, 20 or 10 microns thereof, may be no less than 70% (or no less than 80 or 90%) for any wavelength in the range of 500 nm to 700 nm. The coating composition may be colourless. It may be optically clear. It may be non-cloudy. For these visible light wavelengths, the metal complex may have a molar extinction coefficient of no more than about $5*10^4$ $M^{-1}m^{-1}$, or no more than about $10^4$ or no more than about $5*10^3$ or no more than about $10^3$ or no more than about $10^2$ $M^{-1}m^{-1}$.

The oxygen transmission rate of the coating composition as described in the preceding aspect may be lower than 10 cc/[m²·day]. The water vapor transmission rate of the said coating composition may be lower than 10 gm/[m²·day].

In a specific embodiment, there is provided a coating composition comprising a metal complex comprising an organic acid, e.g. a carboxylic acid or anion thereof, coordinated to an $Fe^{3+}$ ion; and a polymer, wherein there is no covalent bond between said metal complex and the polymer, and wherein the complex is substantially homogeneously distributed through the polymer. This coating composition may have less than about 1% solvent by weight.

In another specific embodiment, there is provided a coating composition comprising a metal complex comprising a carboxylic acid or anion thereof coordinated to a metal ion; and a polymer which is either polyvinyl alcohol or a partially hydrolysed polyvinyl acetate and wherein the complex is substantially homogeneously distributed through the polymer. There may be no covalent bond between said metal complex and the polymer. This coating composition may have less than about 1% solvent by weight.

In another specific embodiment, there is provided a coating composition comprising a metal complex comprising a carboxylic acid or anion thereof coordinated to an $Fe^{3+}$ ion; and a polymer which is either polyvinyl alcohol or a partially hydrolysed polyvinyl acetate, wherein the carboxylic acid or anion of the complex has a second functional group, optionally a second carboxylic acid or a hydroxyl group, which is also coordinated to the $Fe^{3+}$ ion and wherein the complex is substantially homogeneously distributed through the polymer. This coating composition may have less than about 1% solvent by weight.

In a second aspect, there is provided an article comprising a substrate and a coating composition of the first aspect in the form of a layer on a surface of the substrate.

The following options may be used in conjunction with the second aspect, either individually or in any suitable combination.

The coating composition may contain less than about 1% w/v solvent by weight. It may cover substantially all of said surface, e.g. at least about 90, 95 or 99% thereof.

The coating composition may adhere to the substrate. The adhesive strength between the substrate and the coating composition may be greater than the cohesive strength of the coating composition. Thus if sufficient force is applied, the coating composition may fail within the body of the composition rather than at the adhesive interface between the composition and the substrate.

The coating composition may have a thickness in the range of about 1 µm to about 250 µm, for example in the range of 1 µm to 20 µm, optionally in the range of 1 to 10 µm.

The substrate may be for example polymer, glass, wood, silicon, metal, metal alloy or any mixture thereof, or may be some other suitable substrate. The substrate may be degradable by any one, or more, optionally all, of UVA, UVB or UVC radiation. The substrate may be a polymer. It may be a polymer film. In particular, the polymer film may comprise, or may be, a polyester. The polyester may be optionally substituted polyglycolide, optionally substituted polylactic acid, optionally substituted polycaprolactone, optionally substituted polyhydroxyalkanoate, optionally substituted polyhydroxybutyrate, optionally substituted polyethylene adipate, optionally substituted polybutylene succinate, optionally substituted polyethylene terephthalate, optionally substituted polybutylene terephthalate, optionally substituted polytrimethylene tetraphthalate, optionally substituted polyethylene naphthalate or optionally substituted aromatic polyesters produced from a 4-hydroxybenzoic acid and a 6-hydroxynaphthalene-2-carboxylic acid. It may be a blend of any two or more of these.

The article may further comprise a laminate layer bonded to the coating composition layer, whereby the coating composition is disposed between the substrate and the laminate layer. In other words, the laminate layer may be on top of the coating composition, which may be on top of the substrate. The laminate layer may be, or may comprise, a polymer, glass, a mixture thereof or some other material or mixture of materials. For instance, the laminate layer may comprise polypropylene. The polypropylene may be biaxially oriented polypropylene (BOPP). The laminate layer may provide additional barrier properties to inhibit access of undesirable substances to the surface of the substrate.

The oxygen transmission rate of the article as described in the preceding aspect may be lower than 10 cc/[m²·day]. The water vapor transmission rate of the said article may be lower than 10 gm/[m²·day]. The film of the article as described in the second aspect may be substantially non-toxic. It may have no toxic extractables. Any extractables may have an LD50 towards humans of greater than about 1000 mg/kg body weight, or of greater than about 2000, 3000, 4000 or 5000 mg/kg body weight.

In a specific embodiment, there is provided an article comprising a substrate and a coating composition of the first aspect in the form of a layer on a surface of the substrate, said layer having a thickness of about 1 to about 250 microns and having a solvent content of less than about 1% by weight.

In another specific embodiment there is provided an article comprising:
  a substrate and
  a coating composition comprising (i) a metal complex comprising an organic acid, e.g. a carboxylic acid, or anion thereof coordinated to a metal ion; and (ii) either polyvinyl alcohol or a partially hydrolysed polyvinyl acetate, said composition being in the form of a layer on a surface of the substrate, said layer having a thickness of about 1 to about 250 microns and having a solvent content of less than about 1% by weight.

In yet another specific embodiment there is provided an article comprising:
  a substrate and
  a coating composition of the first aspect in the form of a layer on a surface of the substrate, said layer having a thickness of about 1 to about 250 microns and having a solvent content of less than about 1% by weight and
  a laminate layer bonded to the coating composition layer, whereby the coating composition is disposed between the substrate and the laminate layer.

In a third aspect, there is provided a process for making a coating composition, which comprises combining a solution of a metal complex with a solution of a polymer, wherein the metal complex comprises an organic acid, or anion thereof, coordinated to a metal ion. There may be no covalent bond formed between the metal complex and said polymer in the process.

The following options may be used in conjunction with the third aspect, either individually or in any suitable combination.

The metal complex may be as described in the first aspect (above).

The process may comprise a first step of combining a solution of a metal ion (i.e. a salt of the metal ion) with a solution of an organic acid or salt thereof so as to produce the solution of the metal complex.

After obtaining the solution of the metal complex and the polymer, the process may further comprise the step of drying the coating composition. The process may further comprise the step of applying a film of the coating composition onto a surface of a substrate prior to the step of drying.

In a specific embodiment, the process comprises combining an $Fe^{3+}$ ion with a carboxylic acid in an aqueous solvent to produce a solution of a $Fe^{3+}$ complex with the carboxylic acid and combining the solution of the complex with an aqueous solution of a polymer (e.g. polyvinyl alcohol or a partially hydrolysed polyvinyl acetate) to form a coating composition. This embodiment may also comprise drying the coating composition, optionally to a solvent content of less than about 1% by weight. It may comprise applying a film of the coating composition onto a surface of a substrate and drying the coating composition on said surface. In this embodiment the carboxylic acid may have a second functional group, e.g. a second carboxylic acid or a hydroxyl group. The second functional group may also complex with the $Fe^{3+}$ ion.

The process of the third aspect may make the coating composition of the first aspect. The coating composition of the first aspect may be made by the process of the third aspect.

In a fourth aspect, there is provided a process for making an article, comprising the step of applying a coating composition of the first aspect, or a coating composition made by the process of the third aspect, to a surface of a substrate.

The following options may be used in conjunction with the fourth aspect, either individually or in any suitable combination.

The step of applying the coating composition to the substrate may be performed by blade deposition.

The process may further comprise a step of drying the coating composition after said applying. The drying may comprise air flash drying, for example at room temperature. Alternatively, the step of drying may comprise vacuum drying, for example at a temperature in the range of 40° C. to 60° C.

The process may further comprise the step of laminating the article with a laminate layer after said applying. The step of laminating may be performed at a temperature in the range of 100° C. to 150° C. The laminating step may be performed at a roll pressure in the range of 0.8 to 2.5 bars. The step of laminating may comprise applying a laminating layer to a coating composition on the surface of the substrate.

In a specific embodiment, there is provided a process for making an article comprising applying a coating composition of the first aspect, or a coating composition made by the process of the third aspect, to a substrate by blade deposition and applying a laminating layer to a coating composition on the surface of the substrate. The substrate may be a polymer, e.g. a polyester.

In another embodiment there is provided a process for making an article comprising applying a coating composition to a substrate by blade deposition and applying a laminating layer to a coating composition on the surface of the substrate, wherein the coating composition comprises a metal complex comprising an organic acid, e.g. a carboxylic acid, or anion thereof coordinated to an $Fe^{3+}$ ion; and either polyvinyl alcohol or a partially hydrolysed polyvinyl acetate, wherein the organic acid or anion thereof has a second functional group, optionally a carboxylic acid or a hydroxyl group, which is also coordinated to the $Fe^{3+}$ ion. The substrate may be a polymer, e.g. a polyester.

The process of the fourth aspect may make an article according to the second aspect. The article of the second aspect may be made by the process of the fourth aspect.

In a fifth aspect, there is provided a coating composition made by the process of the third aspect.

In a sixth aspect, there is provided an article made by the process of the fourth aspect.

The coating composition as described herein may be used for reducing exposure of a substrate to ultraviolet radiation, said composition being disposed on said substrate. For example, it might be used in food packaging, windows, windshields, prescription glasses or sun screens.

BRIEF DESCRIPTION OF THE DRAWINGS

Specific embodiments of the present invention will now be described, by way of examples only, with reference to the accompanying drawings, wherein.

DEFINITIONS

Figure 1:
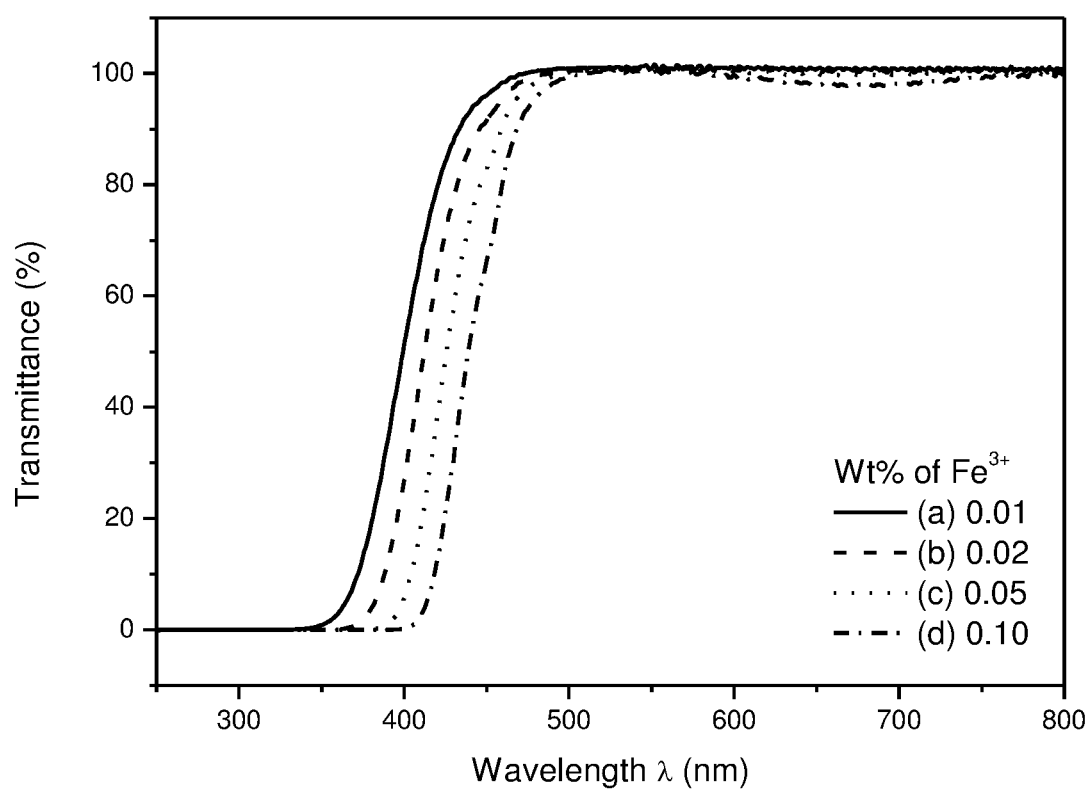
FIG. 1 shows UV-Vis spectra of potassium ferric oxalate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$.
Figure 2:
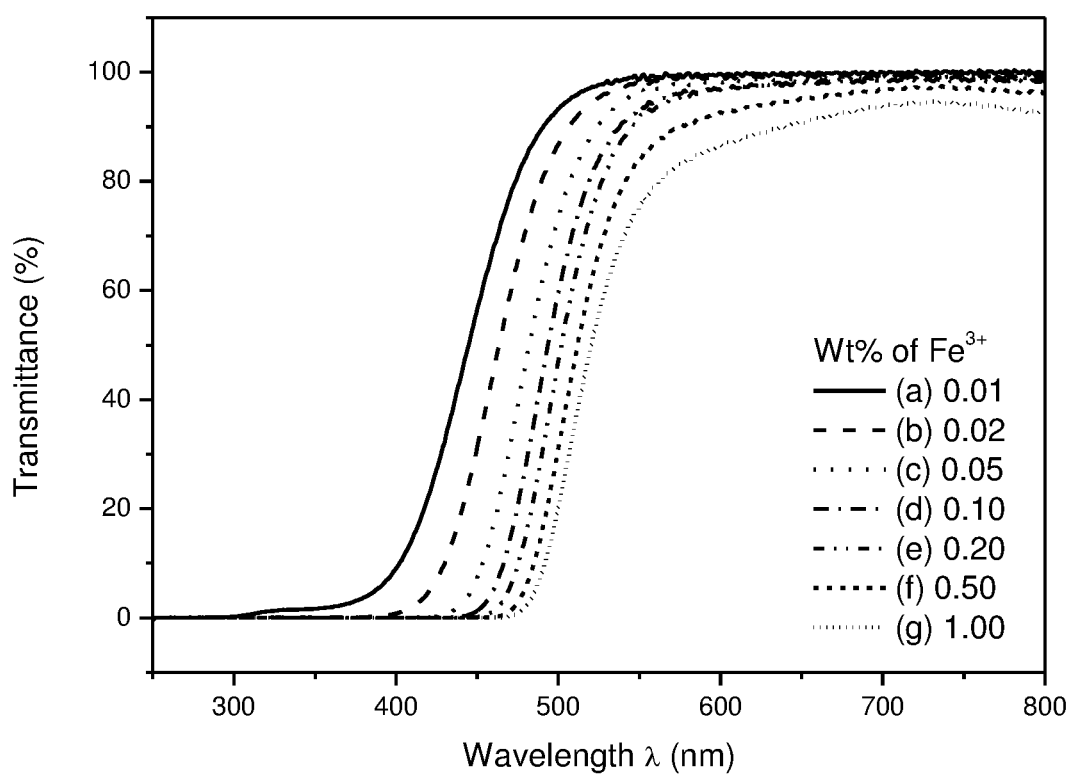
FIG. 2 shows UV-Vis spectra of ferric citrate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$; (e) 0.20 wt % of $Fe^{3+}$; (f) 0.50 wt % of $Fe^{3+}$; (g) 1.00 wt % of $Fe^{3+}$.
Figure 3:
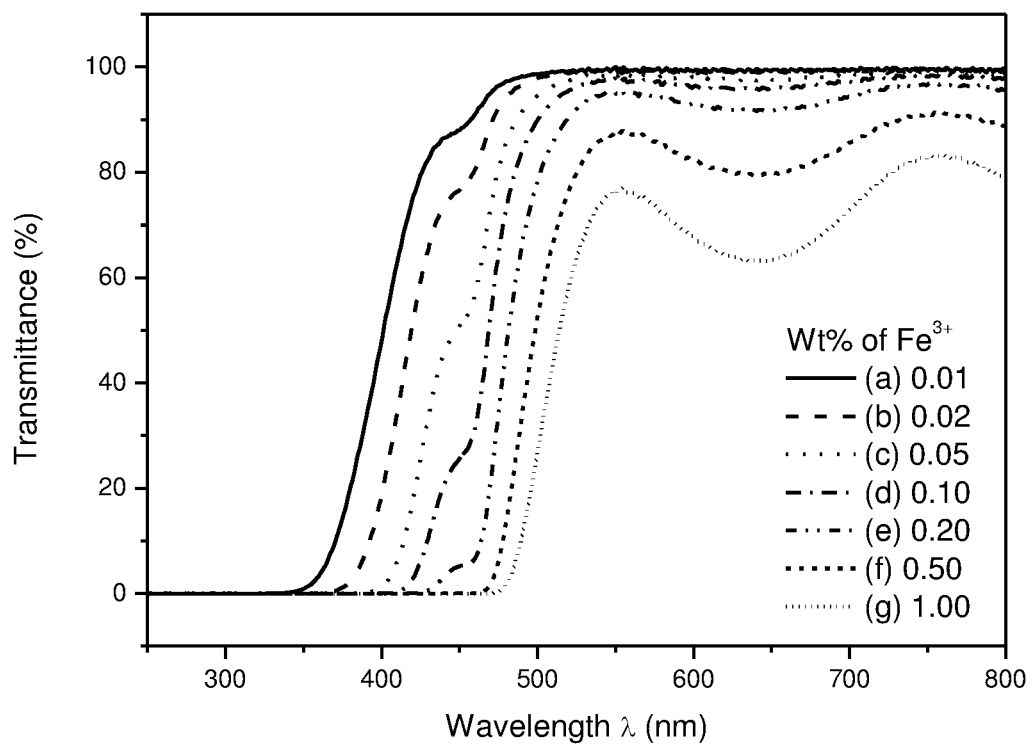
FIG. 3 shows UV-Vis spectra of sodium ferric citrate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$; (e) 0.20 wt % of $Fe^{3+}$; (f) 0.50 wt % of $Fe^{3+}$; (g) 1.00 wt % of $Fe^{3+}$.
Figure 4:
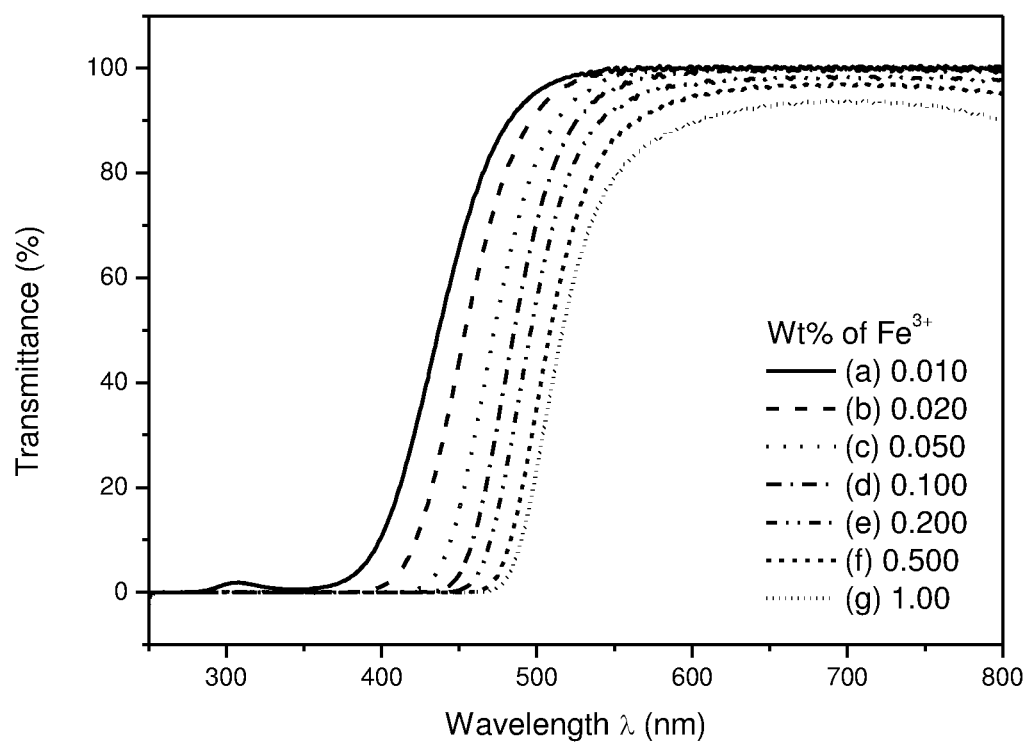
FIG. 4 shows UV-Vis spectra of ferric tartrate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$; (e) 0.20 wt % of $Fe^{3+}$; (f) 0.50 wt % of $Fe^{3+}$; (g) 1.00 wt % of $Fe^{3+}$.
Figure 5:
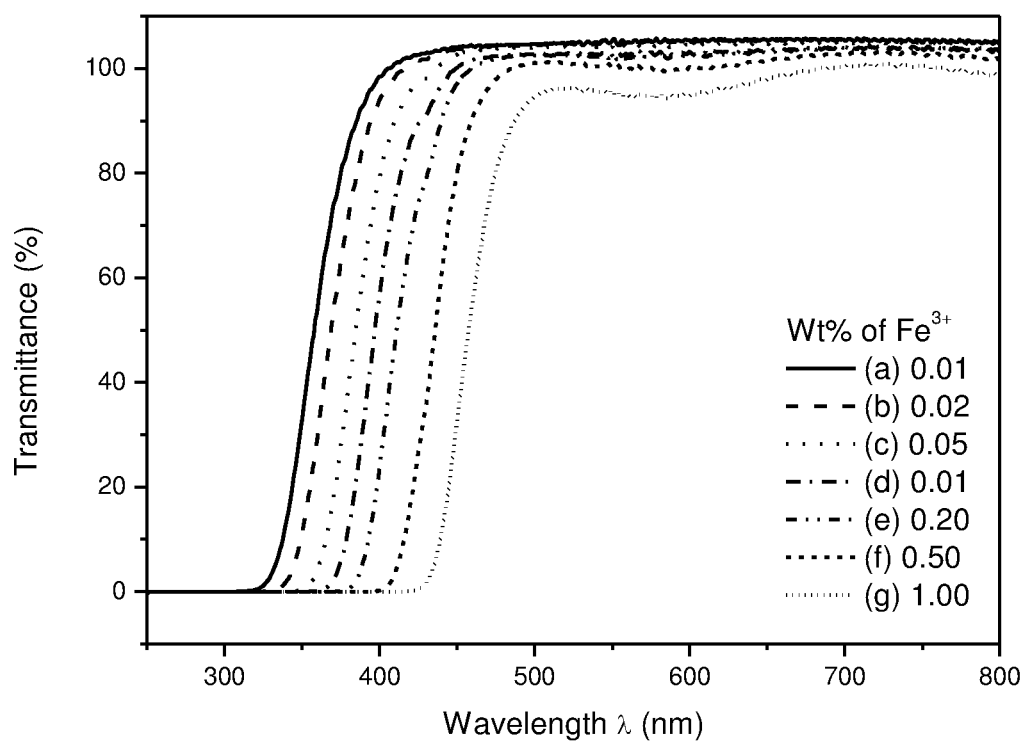
FIG. 5 shows UV-Vis spectra of ferric malonate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$; (e) 0.20 wt % of $Fe^{3+}$; (f) 0.50 wt % of $Fe^{3+}$; (g) 1.00 wt % of $Fe^{3+}$.
Figure 6:
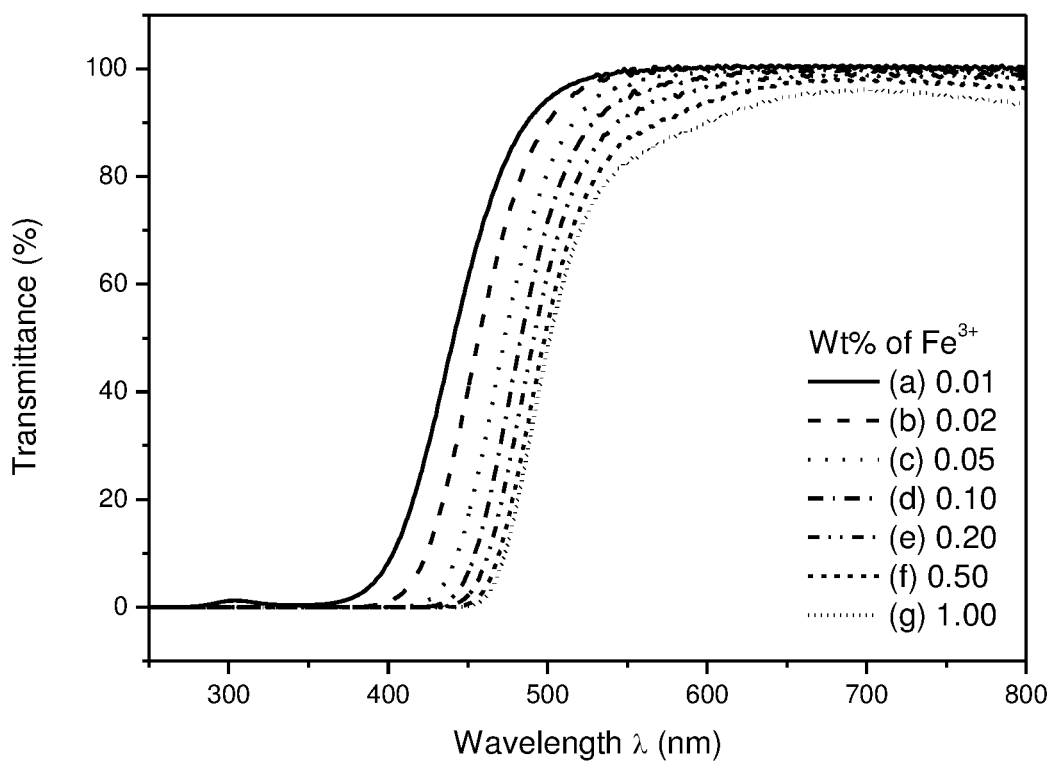
FIG. 6 shows UV-Vis spectra of ferric glycolate complex in $H_2O$. (a) 0.01 wt % $Fe^{3+}$; (b) 0.02 wt % $Fe^{3+}$; (c) 0.05 wt % $Fe^{3+}$; (d) 0.10 wt % $Fe^{3+}$; (e) 0.20 wt % of $Fe^{3+}$; (f) 0.50 wt % of $Fe^{3+}$; (g) 1.00 wt % of $Fe^{3+}$.

In the present specification, "UV blocking compounds" are defined as compounds which may absorb a proportion of incident UV radiation at certain wavelengths. They do not necessarily block 100% of incident UV radiation across all wavelengths. A UV blocking compound incorporated into a composition as described herein may similarly not block 100% of incident UV radiation. A 100 micron thick layer of such a composition may for example absorb greater than about 90% (optionally greater than about 95, 99, 99.5 or 99.9%) of incident UV radiation in the UVA, UVB or UVC ranges or in more than one, optionally all, of these ranges. The ratio of blocked radiation to incident radiation for a thickness of 100 microns of the composition, optionally for a thickness of 50, 20 or 10 microns thereof, may be no less than 90% (or no less than 95 or 99%) for any wavelength in the UVA range, or in the UVB range, or in the UVC range, or in any two, optionally all of these ranges. The ratio of transmitted light intensity to incident light intensity for a thickness of 100 microns of the composition, optionally for a thickness of 50, 20 or 10 microns thereof, may be no greater than about 10%, or 5, 2 or 1%, for any wavelength in the UVA range, or in the UVB range, or in the UVC range, or in any two, optionally all of these ranges.

In the present specification, the term "metal complex" should be understood to include salts of a metal ion. Thus a metal complex will comprise a metal ion together with at least one ligand and/or counterion. The ligand or counterion may be an organic species, commonly containing an acidic group or anion thereof, e.g. a carboxylic acid or carboxylate group. In some instances one or more ligands may be neutral, however commonly at least one ligand will be anionic or a protonated form thereof. In many embodiments of the invention carbenes and/or nitrenes are explicitly excluded as ligands. The bonding between the metal ion and the ligand and a counterion may be ionic bonding or it may be coordination or it may be an intermediate between these. The nature of the bonding between the metal ion and different ligands bonded thereto may be the same or may be different.

In the present specification the term "organic acid" refers to a compound comprising carbon and a functional group containing an acidic hydrogen atom. In this context, an organic acid may have a pKa of less than about 5, optionally less than about 4.5 or 4. An organic acid in this context may be for example a carboxylic acid, a sulphonic acid, a sulphinic acid, a sulfuric acid monoester, a phosphonic acid, a phosphinic acid, a phenol, a thiocarboxylic acid or some other type of organic acid.

In the present specification, "covalent bond" is defined as a type of chemical bond involving the sharing of electrons between atoms in a molecule, especially the sharing of a pair of electrons by two adjacent atoms. The absence of a covalent bond between the polymer and the metal complex in the present specification means that there are no electrons shared between two adjacent atoms of the metal complex and the polymer.

In the present specification, the term "drying" refers to removal of solvent, regardless of the nature of the solvent (although the polymer carrier should not be regarded as a solvent). Thus if organic solvents or cosolvents are used, drying will involve removal of these as well as water.

In the present specification, the term "film" refers to a thin, commonly flexible, form of a material, which may be for example a layer on a surface of a substrate.

In the present specification, "polymer" is used to refer to a chemical compound that comprises linked monomer units, and that may or may not be linear. Commonly a polymer will comprise at least 10 such monomer units per molecule. It may comprise from 10 to about 200 monomer units per molecule, or about 10 to 100, 10 to 50, 20 to 200, 20 to 100, 20 to 50 or 50 to 100 monomer units per molecule, e.g. about 10, 15, 20, 25, 30, 35, 40, 45, 50, 60, 70, 80, 90, 100, 110, 120, 130, 140, 150, 160, 170, 180, 190 or 200 monomer units per molecule. A polymer as used in the present application may have a narrow molecular weight distribution or a broad molecular weight distribution. In some instances it may be essentially monodispersed. The ratio Mw/Mn for the polymers of the invention may be from about 1 to about 10, or about 1 to 5, 1 to 2, 1 to 1.5, 1 to 1.2, 2 to 10, 5 to 10 or 1.5 to 3, e.g. about 1, 1.1, 1.2, 1.3, 1.4, 1.5, 1.6, 1.7, 1.8, 1.9, 2, 2.5, 3, 3.5, 4, 4.5, 5, 6, 7, 8, 9 or 10.

In the present specification, the term "substantially homogeneous" refers to having substantially the same number of metal complex molecules each $mm^3$ in the composition. In the coating composition, the standard deviation of the concentration of metal complex molecules may not be higher than 10%, or 8%, or 6%, or 4%, or 2%, or 1%.

The term "toxic" refers to acute and/or chronic toxicity. Acute "toxicity" is understood as undesired adverse effects that occur immediately after exposure to a toxic substance. Usually the term acute refers to a short-term and high-dose exposure. Chronic "toxicity" refers to undesired health effects that occur or persist after a long-term repeated exposure to a toxic substance (months or years). The toxicity may be human toxicity, or may be mammalian toxicity, or may be toxicity towards some other organism or group of organisms.

The term "comprise" and related terms, as used herein, indicates the presence of the specified integer but does not preclude the presence of other, possibly unspecified, integers. It does not imply that the specified integer represents the predominant integer.

The term "about" shall relate to +10%, optionally +5% or +2% or +1% of the value which is associated with it unless the context indicates otherwise. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Thus, it should be understood that although the present invention has been specifically disclosed by preferred embodiments and optional features, modification and variation of the inventions embodied therein herein disclosed may be resorted to by those skilled in the art, and that such modifications and variations are considered to be within the scope of this invention.

DETAILED DESCRIPTION OF THE PREFERRED EMBODIMENTS

In the current invention, particular metal complexes having organic ligands have been shown to have excellent UV blocking properties. Their UV screening efficiency is not compromised when these complexes are incorporated into coating compositions. Importantly, coating compositions of these complexes may also show good transparency to visible light. This invention provides a novel solution for at least partially blocking UV radiation. The coating compositions of the invention may be transparent, or at least partially transparent, with respect to visible light and may be less harmful than prior art compositions in films and coatings.

Thus the present invention relates to a coating composition comprising a metal complex comprising an organic acid or anion thereof coordinated to a metal ion; and a polymer. The metal complex may function as a UV-light absorber. It has surprisingly been found that the metal-organic acid complexes used in the present invention exhibit good absorption properties in the UV range, good transmission properties in the visible range and a quite sharp transition between absorption and transmission. This transition is in general sharper than for inorganic salts, e.g. chlorides and sulfates, of the same metal ion, and the wavelength range of the transition can readily be manipulated as desired by altering the concentration of the complex. The transition may be over a wavelength range of less than about 200 nm, or less than about 150 or 100 nm.

The metal complex may be produced from a metal ion and an organic acid or anion thereof. The organic acid or anion thereof may be any of a variety of organic compounds with acidic properties. Hence, it may be a carboxylic acid, a sulphonic acid, (such as taurine and triflic acid), a sulphinic acid, a sulfuric acid monoester, a phosphonic acid, a phosphinic acid, a phenol, a thiocarboxylic acid or an anion of any thereof. The polymer may serve as a vehicle or a carrier for the metal complex for forming a cohesive film. Therefore the polymer may be a film-forming polymer. It may be for example a flexible polymer. It may have a Tg below room temperature, or below the intended use temperature, e.g. below about 20, 15, 10, 5 or 0° C. For ease of preparation, the metal complex may be pre-formed and then mixed together with the polymer. This may reduce the likelihood of the two components engaging in covalent bonding.

In some embodiments the metal complex and the polymer are both in solution in a solvent. This contributes to ensuring that the metal complex and the polymer are homogeneous in composition, and consequently homogeneous in the coating composition. The solvent may be aqueous. It may be deionised water. It may contain no organic solvent. Alternatively it may contain an organic cosolvent to improve the solubility of one or more of the components of the film. Suitable organic cosolvents, if present, include lower alcohols (methanol, ethanol, isopropanol etc.), acetone, THF, dioxane etc. The solution may contain one or more salts, such as sodium chloride, potassium chloride or calcium chloride or may contain no salts other than the metal complex. Whereas such a solution may in itself have suitable UV blocking properties, it is generally used as an intermediate in the preparation of a UV blocking film. Such a film may be formed by drying a film of the solution on a substrate.

As discussed above, the coating composition may be a dry film. It may therefore comprise less than about 1% solvent (in total) by weight, or less than about 0.9, 0.8, 0.7, 0.6, 0.5, 0.4, 0.3, 0.2, or 0.1% solvent by weight. This may be achieved by evaporating the solvent from the solution described above. The solvent may be evaporated by air drying. In particular, it may be evaporated by air flash for about 4 to about 12 hours, or for about 4-10, 4-8, 4-6, 6-12, 8-12 or 10-12 hours, e.g. for about 4, 5, 6, 7, 8, 9, 10, 11 or 12 hours. It may additionally or alternatively be achieved by vacuum oven drying at elevated temperature for about 4 to about 12 hours, or for about 4-10, 4-8, 4-6, 6-12, 8-12 or 10-12 hours, e.g. for about 4, 5, 6, 7, 8, 9, 10, 11 or 12 hours. The vacuum drying may be conducted at elevated temperature, e.g. at about 30 to about 80° C., or about 30 to 70, 30 to 60, 40 to 80, 50 to 80 or 40 to 60° C., e.g. at about 30, 40, 50, 60, 70 or 80° C. The pressure in the vacuum oven may be for example between about 0.1 and 10 kPa absolute, or about 0.1 to 1, 1 to 10 or 0.5 to 5 kPa, e.g. about 0.1, 0.5, 1, 1.5, 2, 2.5, 3, 3.5, 4, 4.5, 5, 6, 7, 8, 9 or 10 kPa. In a specific example, there may be used a combination of air flash drying followed by vacuum oven drying at about 50° C. and about 1 to about 10 kPa. An extended evaporation time may be required in order to achieve a coating composition which comprises less than about 1% solvent by weight. There may be essentially no solvent left in the coating composition after drying. The drying time will depend on a number of factors including the amount of solvent to be evaporated, the vapour pressure of the solvent, the nature of the polymer and the precise conditions of drying. It should be noted that the term "drying" in this context refers to removal of solvent, regardless of the nature of the solvent (although the polymer carrier should not be regarded as a solvent). Thus if organic solvents or cosolvents are used, drying will involve removal of these as well as water.

The metal complex and the polymer may be distributed substantially homogenously through the composition. There may be substantially the same number of metal complex molecules each $mm^3$ in the composition. In the coating composition, the standard deviation of the concentration of metal complex molecules may not be higher than 10%, or 8%, or 6%, or 4%, or 2%, or 1%.

The metal of the metal complex may be a group 8 element, or may be a group 9 element or may be a group 10 element. Examples for group 8 elements include iron, ruthenium and osmium. Examples for group 9 elements include cobalt, rhodium and iridium. Examples for group 10 elements include nickel, palladium and platinum. These elements provide suitable coordinating ability with the chosen organic acids. A combination of these elements from different groups, or from the same group, may be used. These may be used in any desired mixing ratio. In particular, the metal may be any one of iron, nickel, cobalt and ruthenium. It may be a mixture of any of any two, three or all of iron, nickel, cobalt and ruthenium. The mixture may be in any mixing ratio. Optionally, the metal is iron. Iron may be used in its various oxidation states. It may be used as a $Fe^{2+}$. It may be used as a $Fe^{3+}$. It may be a mixture of $Fe^{2+}$ and $Fe^{3+}$. Surprisingly, it has been found, that a metal complex comprising Fe as a metal ion has very favorable UV blocking properties. In particular, $Fe^{3+}$ having an organic acid such as a carboxylic acid, or anion thereof, coordinated to it, has excellent UV blocking properties whilst retaining transparency in the visible range.

The organic acid or anion thereof may be a carboxylic acid. The carboxylic acid, or anion thereof, may further comprise a second functional group coordinated with the metal ion. The effect of a second functional group would be to enhance coordination to the metal ion. This second functional group may be electron donating. This second functional group may be for example a second acidic, e.g. carboxyl, group, or a hydroxyl group or a thiol group or an anion of any one of these. It may be an amine, an epoxide, a heterocyclic ring such as pyrrole, a pyridine, or a pyrazole. Commonly it is not a carbene or a nitrene.

The carboxylic acid, or anion thereof, may for example be a dicarboxylic acid, or a mono- or dianion thereof, or a tricarboxylic acid, or a mono-, di- or trianion thereof. It may be a combination of a mono-carboxylic acid, or an anion thereof, and a dicarboxylic acid, or a mono- or dianion thereof. It may be a combination of a dicarboxylic acid, or a dianion thereof, and a tricarboxylic acid, or a mono-, di- or trianion thereof. In particular, the carboxylic acid may be oxalic acid, malonic acid, succinic acid, glutaric acid, malic acid, tartaric acid, glycolic acid, lactic acid, citric acid, isocitric acid and aconitic acid or a corresponding anion of any one of these. Alternatively it may be formic acid, optionally substituted acetic acid, optionally substituted propionic acid, optionally substituted butyric acid, optionally substituted valeric acid, optionally substituted caproic acid, optionally substituted enanthic acid or optionally substituted caprylic acid, or an anion of any thereof. The organic acid, or anion thereof, may comprise 2-8 carbon atoms, or 2-6, 2-4, 4-6 or 4-8 carbon atoms, e.g. 2, 3, 4, 5, 6, 7, or 8 carbon atoms. Organic acids and anions thereof of this size and with these properties have very favorable coordination properties with the metal ion and allow for excellent UV blocking. The organic acid may be aromatic or it may be aliphatic. It may be saturated (other than the acidic group or groups) or may be unsaturated.

Suitable examples of the organic acid include oxalic acid (a), citric acid (b), tartaric acid (c), malonic acid (d) and glycolic acid (e), represented by the chemical formulae in the following scheme:

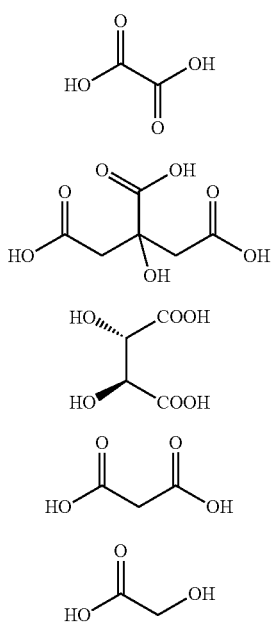

The corresponding mono-, di- or tri-anions of these may also be used.

The metal content in the coating composition may be in the range of about 0.0005 wt % to about 2.0 wt %. It may be in the range of about 0.0005 wt % to about 1.5 wt %, or 0.0005 wt % to 1.0 wt %, 0.0005 wt % to 0.5 wt %, 0.0005 wt % to 0.2 wt %, 0.0005 wt % to 0.1 wt %, 0.0005 wt % to 0.05 wt %, 0.0005 wt % to 0.02 wt %, 0.0005 wt % to 0.01 wt %, 0.0005 wt % to 0.005 wt %, 0.0005 wt % to 0.002 wt %, 0.0005 wt % to 0.001 wt %, 0.001 wt % to 2.0 wt %, 0.002 wt % to 2.0 wt %, 0.005 wt % to 2.0 wt %, 0.01 wt % to 2.0 wt %, 0.02 wt % to 2.0 wt %, 0.05 wt % to 2.0 wt %, 0.1 wt % to 2.0 wt %, 0.2 wt % to 2.0 wt %, 0.5 wt % to 2.0 wt %, 1.0 wt % to 2.0 wt %, 1.5 wt % to 2.0 wt %, 0.05 wt % to 1.0 wt %, 0.01 wt % to 0.5 wt % or 0.005 wt % to 0.05 wt %, e.g. of about 0.0005 wt %, 0.001 wt %, 0.002 wt %, 0.005 wt %, 0.01 wt %, 0.02 wt %, 0.05 wt %, 0.1 wt %, 0.2 wt %, 0.5 wt %, 1.0 wt %, or about 2.0 wt %.

The polymer used in the coating composition may be a water soluble polymer. It may be a natural polymer or it may be a synthetic polymer. It may be a homomer or a copolymer. It may be a block copolymer or it may be an alternating copolymer or it may be a random copolymer or it may be a comb copolymer or it may be a copolymer of some other structure. It may be a polymer blend. It may be a rubbery polymer. In many instances the polymer will be a commercial product, although in some instances it may be purpose made for a particular application. In general it will be selected for its water solubility. Alternatively or additionally it may be selected for its transparency. It may contain hydrophilic groups that are substituents or are incorporated into the backbone. The hydrophilic groups may be nonionic, anionic, cationic or amphoteric. The polymer may for example be dextran, poly(acrylic acid sodium salt), poly (ethylene glycol), poly(methacrylic acid sodium salt), poly (styrenesulfonic acid sodium salt), pullulan or polyvinyl ester (e.g. acetate) or a partially hydrolysed polyvinyl ester. The partially hydrolysed polyvinyl ester may be hydrolysed to a degree of from 10% to about 90%, or about 10 to 70, 10 to 50, 10 to 30, 30 to 90, 50 to 90, 70 to 90, 30 to 70, 30 to 50 or 50 to 70%, e.g. about 10, 20, 30, 40, 50, 60, 70, 80 or 90%. In the case of polycarboxylic acids such as polymethacrylic acid, these may be fully ionised, partially ionised or unionised. A monomer unit of the polymer may comprise a hydroxyl group. It may additionally or alternatively comprise a thiol, a carboxylic acid, an amine, a nitro, a ketone, a halogen, a phosphonate ester, an imine, a hydroxylamine, an epoxide, an acetal, a nitrate, or any combination of these. In particular, the polymer may be polyvinyl alcohol, a partially hydrolyzed polyvinyl alcohol ester or a derivative or copolymer thereof. It may be a polyvinyl acetal, for example a polyvinyl butyral, or a polyvinyl formal. It may be a blend of any two or more of these. The polymer may be a transparent polymer. It may be such that at each wavelength between 500 and 700 nm, the ratio of transmitted light intensity to incident light intensity is at least about 90%, optionally at least about 95, 96, 97, 98, 99 or 99.5%, for a film of thickness 100 microns, optionally for a film of thickness 50, 20 or 10 microns.

The ratio of polymer to the metal may be in the range of about 40:1 to about 2:1 by weight. It may be in the range of about 35:1 to 2:1, 30:1 to 2:1, 25:1 to 2:1, 20:1 to 2:1, 15:1 to 2:1, 10:1 to 2:1, 6:1 to 2:1, 4:1 to 2:1, 40:1 to 4:1, 40:1 to 6:1, 40:1 to 10:1, 40:1 to 15:1, 40:1 to 20:1, 40:1 to 25:1, 40:1 to 30:1, 40:1 to 35:1, 35:1, to 4:1, 30:1 to 6:1, 25:1 to 10:1, 20:1 to 15:1, e.g. about 2:1, 4:1, 6:1, 10:1, 15:1, 20:1, 25:1, 30:1, 35:1, or 40:1, or may be some other suitable ratio.

The polymer in the compositions of the invention is not covalently bonded to the metal complex. Thus there may be no covalent bond between the metal and the polymer. There may be no covalent bond between the organic acid and the polymer. In some instances there may be no ionic bond between the metal and the polymer. There may be no ionic bond between the organic acid and the polymer. Thus there may be no ionic bond between the metal complex and the polymer. There may be no complexation between the metal and the polymer. There may be no complexation between the organic acid and the polymer. In certain cases there may be no bond between the metal and the polymer. There may be no bond between the organic acid and the polymer. There may be no bond between the polymer and the metal complex.

The coating composition may have the ability to absorb light in the UV range. In particular, the transmission of any one or more, optionally all, of UVA, UVB and UVC radiation at a specific wavelength or range may be at least 90%, or 95%, or 99% blocked by a thickness of 10 microns of said composition, optionally by a thickness of 5 microns or of 1 micron thereof.

In this context, this should be taken to mean that the designated thickness blocks at least 90%, or 95%, or 99% of incident radiation at any wavelength within the relevant range. The quantitation of this blocking has been defined earlier in this specification. It should be noted that UVA has a wavelength range of 315 to 400 nm, UVB of 280 to 315 nm and UVC of 100 to 280 nm. Visible light is taken to be within the range of 400 to 700 nm. The thickness of said composition may be about 1 to about 100 microns, or about 1 to 50, 1 to 20, 20 to 100, 5 to 100, 10 to 100, 20 to 100, 50 to 100, 10 to 20 or 20 to 50 microns e.g. about 90, 80, 70, 60, 50, 40, 30, 20, 10, 5, 4, 3, 2 or 1 microns.

The thickness required to absorb a particular proportion of incident radiation will depend on the concentration of the metal complex in the composition, as well as on the particular absorption characteristics of the specific metal complex used in the composition. The above absorptions are typically for dry films (i.e. less than about 1% solvent), and with the ratio of metal complex to polymer as described elsewhere herein. In order to obtain a dry film having the desired absorption characteristics, it will typically be necessary to apply a film of up to 200 microns (e.g. 50 to 200, 50 to 100, 100 to 200 or 80 to 150 microns, for example 50, 60, 70, 80, 90, 100, 120, 140, 160 180 or 200 microns) of a solution of the polymer and metal complex and then dry the resulting film. The actual thickness of solution will depend on the concentration of polymer and metal complex in the film, the nature of the metal complex and the desired absorption characteristics.

The transmission of ultra-violet radiation in a designated wavelength range may be at least about 90%, or 95%, or 99% blocked by a thickness of 1 mm of said composition, optionally by a thickness of 50 microns or of 20 microns or of 10 microns or of 5 microns or of 2 microns or of 1 micron thereof. For this purpose the designated wavelength range may be about 160 nm to about 480 nm, or about 160 to 400, 160 to 300, 200 to 480, 300 to 480, 200 to 300, 200 to 400 or 300 to 400 nm. By this, it is meant that within the designated range, the designated amount of incident radiation is blocked at any wavelength in that range. Optionally, UV radiation may be blocked by a thickness of about 0.5 mm, or about 0.3 mm, 0.2 mm, 0.1 mm, 80 microns, 60 microns, 40 microns or 30 microns. The UV blocking may in some instances be distributed somewhat unevenly, it may absorb at certain wavelengths substantially 99% of UV light and at other wavelengths only 90%. In particular, a coating composition may absorb substantially 99% of UV light in the wavelength range 250 nm to 280 nm and 320 nm to 370 nm, but may only absorb 95% of UV light in the range of 280-320 nm.

The coating composition may be transparent. For example at least 70%, or 80%, or 90%, or 95% of visible light in the range of 500 nm to 700 nm, or in the range of 550 nm to 700 nm, 600 nm to 700 nm, 650 nm to 700 nm, 500 nm to 650 nm, 500 nm to 600 nm, 500 nm to 550 nm, e.g. at about 500 nm, 550 nm, 600 nm, 650 nm or 700 nm may be transmitted through a thickness of 100 microns of said composition, optionally by a thickness of 50, 20, 10, 5, 2 or 1 microns thereof. Optionally, the coating composition may be transparent through a thickness of 0.5 mm, 0.3 mm, 0.2 mm, 0.1 mm, 80 microns, 60 microns, 40 microns or 30 microns. The coating composition may be substantially colourless. It may be colourless.

The present invention additionally refers to an article comprising a substrate and a coating composition in the form of a layer on a surface of the substrate. The substrate may function as a substantially inert carrier. It may make no contribution, or a minor contribution, to the UV blocking as described for the coating composition before. It may serve as an additional protection layer and alternatively or additionally as a packaging device for use with the coating composition. It may have properties to support the flexibility of the polymer film in the coating composition.

The coating composition may be in the form of a layer on a surface of the substrate. It may be a dry layer, as contrasted to a solution. It may contain less than about 1% w/v solvent by weight or less than about 0.9, 0.8, 0.7, 0.6, 0.5, 0.4, 0.3, 0.2, or 0.1% solvent by weight. It may cover substantially all of said surface, e.g. at least about 90, 95 or 99% thereof, e.g. 91, 92, 93, 94, 96, 97, 98, 99 or 100% thereof. It may be dry to the touch. It may be non-tacky.

The adhesive strength between the substrate and the coating composition may be greater than the cohesive strength of the coating composition. Thus if sufficient force is applied, the coating composition may fail within the body of the composition rather than at the adhesive interface between the composition and the substrate. This ensures a suitable hold between the surface of the substrate and the coating composition. There may be no peel off observed under tape peel off testing.

The coating composition may have a thickness in the range of about 1 µm to about 250 µm, 1 µm to 200 µm, 1 µm to 150 µm, 1 µm to 100 µm, 1 µm to 50 µm, 1 µm to 20 µm, 1 µm to 10 µm, 1 µm to 5 µm, 5 µm to 250 µm, 10 µm to 250 µm, 20 µm to 250 µm, 50 µm to 250 µm, 100 µm to 250 µm, 150 µm to 250 µm, 200 µm to 250 µm, e.g. 1, 2, 5, 10, 20, 50, 100, 150, 200 or 250 µm. In a specific example, it may be in the range of 1 µm to 20 µm, optionally in the range of 1 µm to 10 µm.

The minimal coating thickness may vary depending on the metal complex concentration. Lower concentrations of the metal complex may need to have higher coating thickness and vice versa in order to obtain the desired properties.

The substrate may be for example polymer, glass, wood, silicon, metal, metal alloy or any mixture thereof, or may be some other suitable substrate. The substrate may be flexible. Alternatively, it may be rigid. A suitable substrate would be a material on which surface a layer of the coating composition may be applied. The substrate may be degradable by any one, or more, optionally all, of UVA, UVB or UVC radiation or may be substantially transparent to any one or more, optionally all, of these. The substrate may be a substance in need of a UV blocking layer. The coating composition may therefore function as a protective layer, to protect from such degradation. In the event that the substrate is a container, e.g. a bottle, the composition of the present invention may provide UV blocking properties not provided by the substrate alone. This may be useful in cases where UV sensitive materials (e.g. foodstuffs) are to be contained in the container.

The substrate may be, or may comprise, a polymer. It may be a natural polymer, such as a protein. It may be a synthetic polymer, such as plastics, for example a polystyrene. It may be a polymer film. The polymer film may be flexible. In order to ensure flexibility, it may have a Tg below room temperature, or below the intended use temperature, e.g. below about 20, 19, 18, 17, 16, 15, 14, 13, 12, 11, 10, 9, 8, 7, 6, 5, 4, 3, 2, 1 or 0° C.

In particular, the substrate may comprise, or may be, a polyester. It may be a homopolymer. It may be a copolymer. It may be an aliphatic polyester. It may be a semi-aromatic polyester. It may be an aromatic polyester. The polyester may be optionally substituted polyglycolide, optionally substituted polylactic acid, optionally substituted polycaprolactone, optionally substituted polyhydroxyalkanoate, optionally substituted polyhydroxybutyrate, optionally substituted polyethylene adipate, optionally substituted polybutylene succinate, optionally substituted polyethylene terephthalate, optionally substituted polybutylene terephthalate, optionally substituted polytrimethylene tetraphthalate, optionally substituted polyethylene naphthalate and optionally substituted vectran. It may be a blend of any two or more of these. Any of these may be in the form of a polymer film.

The article may further comprise a laminate layer bonded to the coating composition layer, whereby the coating composition is disposed between the substrate and the laminate layer. In other words, the laminate layer may be on top of the coating composition, which may be on top of the substrate. Lamination is referred to as a technique of manufacturing a material in multiple layers, so that the composite material achieves improved strength, stability, sound insulation, appearance or other properties from the use of differing materials. The thickness of the lamination layer may be in the range of about 10 to about 1000 microns, e.g. about 10 to 500, 10 to 200, 10 to 100, 100 to 1000, 200 to 1000, 500 to 1000, 100 to 500, 100 to 200 or 200 to 500 microns, for example about 10, 20, 30, 40, 50, 60, 70, 80, 90, 100, 150, 200, 250, 300, 350, 400, 450, 500, 600, 700, 800, 900 or 1000 microns, or it may be less or more than that. The laminate layer may function to minimize direct contact of the metal complex to the surfaces of the article. The laminate layer may be, or may comprise, a polymer, glass, a mixture thereof or some other material or mixture of materials. In particular, it may be flexible. In cases wherein the coating composition and the substrate both comprise a polymer, it may be a flexible polymer. A suitable laminate layer may comprise polypropylene. This polypropylene may be biaxially oriented polypropylene (BOPP).

The oxygen transmission rate of the article as described above, optionally of the layer of the coating composition alone, may be lower than 10 cc/[m$^2$·day], or lower than 9, 8, 7, 6, 5, 4, 3, 2 or 1 cc/[m$^2$·day]. This provides an additional protection barrier against oxidation for any material being on the opposite side of the article (or contained within the article, if the article is a container). Oxygen permeability of the article may be measured by using Mocon oxygen permeability OX-TRAN Model 2/21 according to ASTM D3985-02. In this test, a film is placed on a stainless steel mask with an open testing area of 5 cm$^2$. Oxygen permeability measurements are then conducted at 23° C. (1 atm.) and 0% relative humidity by placing the coated surface of films to the oxygen rich side.

The water vapor transmission rate of the article may be lower than 10 gm/[m$^2$·day]. This would provide an additional protection barrier against moisture for any material being on the opposite side of the article (or contained within the article, if the article is a container). Water vapor permeability of the article may be measured by using Mocon water vapor permeability PERMATRAN-W Model 3/33 according to ASTM F1249-06. In this test, a film is placed on a stainless steel mask with an open testing area of 5 cm$^2$. Water vapor permeability measurements are then conducted at 37.8° C. (1 atm) and 90% relative humidity by placing the coated surface of the film to the water vapor rich side.

The film of the article may be substantially non-toxic or may have no toxic extractables. Hence, the article may have application in food packaging, alternatively direct human contact, direct mammal contact or in any other suitable application, commonly one which requires the absence of toxic materials and extractables.

The present invention additionally relates to a process for making a coating composition, which comprises combining a solution of a metal complex with a solution of a polymer, wherein the metal complex comprises a carboxylic acid, or anion thereof, coordinated to a metal ion. Thus, the metal complex may be provided in a suitable solvent as described elsewhere above and mixed with a first polymer in a suitable solvent. The solvent being used may be the same in both solutions. The solutions thus combined may produce a mixture, in which the polymer and the metal complex are substantially homogeneously distributed, as described elsewhere above. This assists in developing a homogeneous distribution of the metal complex in the ensuing coating composition. The mixing may be conducted at room temperature or at other suitable temperature, e.g. between about 10 and about 50° C., or between about 10 and 40, 10 and 30, 10 and 20, 20 and 50, 30 and 50 or 20 and 30° C., e.g. at about 10, 15, 20, 25, 30, 35, 40, 45 or 50° C. The combining may comprise mixing, stirring, swirling or otherwise agitating the combined solutions so as to render the combined solution substantially homogeneous.

Preceding the step of combining the metal complex and the polymer in order to produce the coating composition, the process may comprise a first step of combining a solution of a metal ion with a solution of a carboxylic acid or salt thereof so as to produce the solution of the metal complex. The metal complex may be dried. Alternatively, it may be left standing, allowing the metal complex to crystallize from the concentrated solution. After crystallization, the metal complex with substantial purity may be filtered off the solution. Alternatively, it may be freeze dried, or lyophilized. The freeze-drying may occur in a range from about −100° C. to about −5° C., or −90 to −5, or −80 to −5, or −80 to −5, or −70 to −5, or −60 to −5, or −50 to −5, or −40 to −5, or −30 to −5, or −30 to −5, or −20 to −5, or −10 to −5, or −100 to −10, or −100 to −20, or −100 to −30, or −100 to −40, or −100 to −50, or −100 to −60, or −100 to −70, or −100 to −80, or −100 to −90, e.g. −100, −90, −80, −70, −60, −50, −40, −30, −20, −10, −5° C. In a specific example, the freeze-drying occurs at a temperature of −80° C. The time allowed for freeze-drying may be for several days, i.e. in the range of 1-5 days, or 1-2, 1-3, 1-4, 2-5, 3-5, 4-5 days. In a specific example, the time allowed for freeze-drying was 3 days. Upon purification of the metal complex, the metal complex may be stored. It may be stored away from light. Alternatively, the solution containing the metal complex may be used directly.

After obtaining the solution of the metal complex and the polymer, the process may further comprise the step of drying the coating composition. This step preferably involves removal of the solvent to a solvent content below about 1% by weight. Additionally, it may result in solidification of the coating composition on the surface of a substrate, while commonly still retaining flexibility. Additionally, the drying step may improve the adhesive force between the coating composition and the surface of a substrate.

Hence, the process may further comprise the step of applying a film of the coating composition onto a surface of a substrate prior to the step of drying.

The present invention additionally refers to a process for making an article, comprising the step of applying a coating composition, or a coating composition made by the process described above, to a surface of a substrate. This step typically ensures a suitable adhesive strength between the coating composition and the surface of the substrate. It may be preformed, while the coating composition is still in solution, to ensure an even distribution of the coating composition on the surface of the substrate. This step can be performed by deposition or painting. Alternatively, it may be performed by thermal spraying. It may be performed by spin coating.

The step of applying the coating composition to the substrate may be performed by various deposition techniques. In particular, it may be performed by blade deposition. A blade coating method comprises using a blade for coating the surface of the substrate with a coating liquid to form a coating layer on a to-be-coated surface of the substrate. The thickness of the coating layer of such process can be adjusted and is described elsewhere herein. Alternative methods for applying the coating composition include brushing, spraying, wiping, dipping etc.

The process may further comprise a step of drying the coating composition after said applying. The drying may comprise air flash drying, for example at room temperature, or at any temperature in the range of about 10° C. to about 40° C., or 20 to 40, 30 to 40, 10 to 30, 10 to 20° C., e.g. at 10, 15, 20, 25, 30, 35 or 40° C. Alternatively, the step of drying may comprise vacuum drying, for example at a temperature in the range of 40° C. to 60° C., or 40 to 55, 40 to 50, 40 to 45, 45 to 60, 50 to 60 or 55 to 60° C., e.g. at 40, 45, 50, 55 or 60° C.

The process may further comprise the step of laminating the article with a laminate layer after said applying. Lamination may be performed by heat, pressure, welding, or adhesives. The step of laminating may be performed at a temperature in the range of 100° C. to 150° C., or 100 to 140, 100 to 130, 100 to 120, 100 to 110, 110 to 150, 120 to 150, 130 to 150, or 140 to 150° C., e.g. at 100, 110, 120, 130, 140 or 150° C. The laminating step may additionally be performed at a roll pressure in the range of about 0.8 to about 2.5 bars, or in the range of 0.8 to 2.0, 0.8 to 1.5, 0.8 to 1.0, 1.0 to 2.5, 1.5 to 2.5, or 2.0 to 2.5 bar, e.g. at about 0.8, 1.0, 1.5, 2.0, or 2.5 bar. The step of laminating may comprise applying a laminating layer to a coating composition on the surface of the substrate.

The coating composition as described herein may be used for reducing exposure of a substrate to ultraviolet radiation, wherein the coating composition is being disposed on said substrate. It may also be used for reducing exposure of any matter which is on the opposite side (or the inside in the event that it is a container) of the article as described herein to UV radiation. Additionally, since the article as described herein has good oxygen and water vapor barrier qualities, it may also be used to prevent oxidation and damage from moisture from any matter being on the opposite side of the article. For example, it might be used in food packaging, bottles, windows, windshields, prescription glasses or sun screens.

The following describes specific examples of a suitable process for making the coating composition and the article of the invention.

The solutions of ferric complexes used in particular embodiments of the present invention are composed of deionised water, ferric chloride hexahydrate and one of five different organic acid ligands. These organic acid ligands could be used in their pure acidic form, deprotonated with potassium hydroxide or sodium hydroxide, or salts of sodium or potassium. The five organic acid ligands exemplified in the present invention are oxalic acid, tartaric acid, citric acid, malonic acid and glycolic acid. The generic synthesis process involves stirring organic acid in deionised water and adding an aqueous solution of ferric chloride hexahydrate. The mixture is made up to 1.00 wt % of $Fe^{3+}$ ions with deionised water. Dilution of this stock solution yields solutions in the range of 0.001-0.90 wt % of $Fe^{3+}$ ions.

UV spectra of the solutions were acquired for 0.01-1.00 wt % of $Fe^{3+}$ ions for all complexes except potassium ferric oxalate (0.001 wt %-0.100 wt % $Fe^{3+}$) and ferric tartrate (0.001 wt %-1.000 wt % $Fe^{3+}$). For clarity, only selected concentrations are depicted in FIGS. 1 to 6. It is important to highlight that with the exception of ferric malonate, all other ferric complexes in the present invention efficiently screen 94.3-100.0% of UV radiation between 250-400 nm with concentrations less than 0.05 wt % of ferric ions. Besides that, solutions of the aforementioned concentration show excellent transparency of more than 80% in the visible range. Ferric malonate requires a higher concentration of 0.5 wt % of $Fe^{3+}$ to achieve the same efficiency of UV blocking property. These properties would be suitable in UV blocking applications with excellent UV screening, transparency at low $Fe^{3+}$ concentrations.

Figure 7:
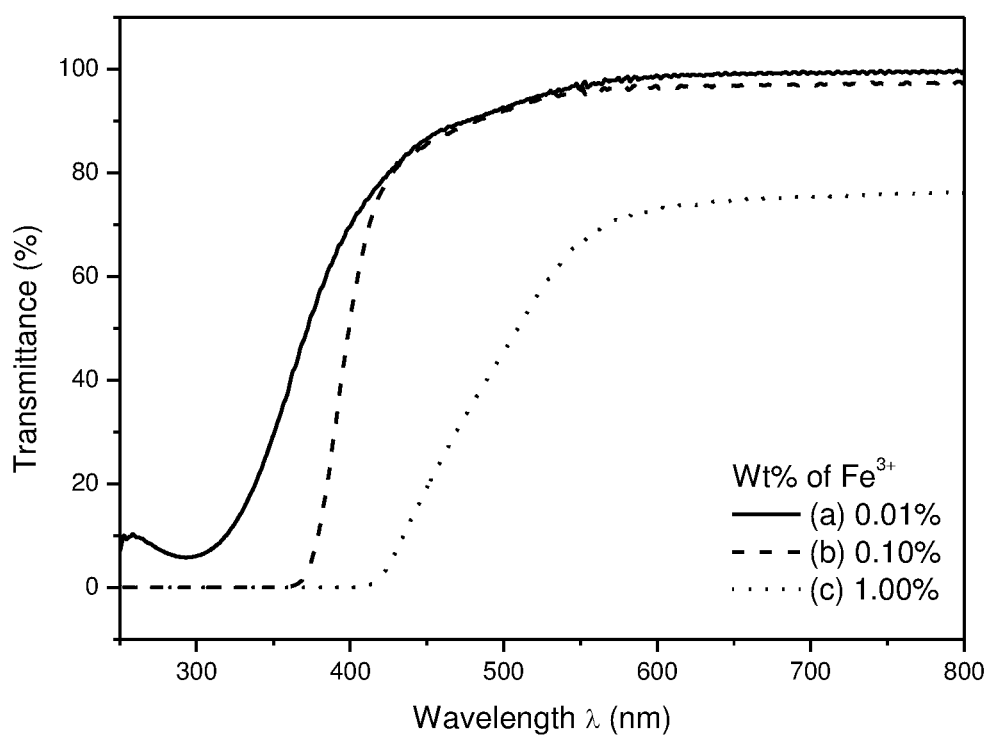
FIG. 7 shows UV-Vis spectra of ferric chloride complex in $H_2O$. (a) 0.01 wt % $Fe^{3+}$; (b) 0.10 wt % $Fe^{3+}$; (c) 1.00 wt % of $Fe^{3+}$.
Figure 8:
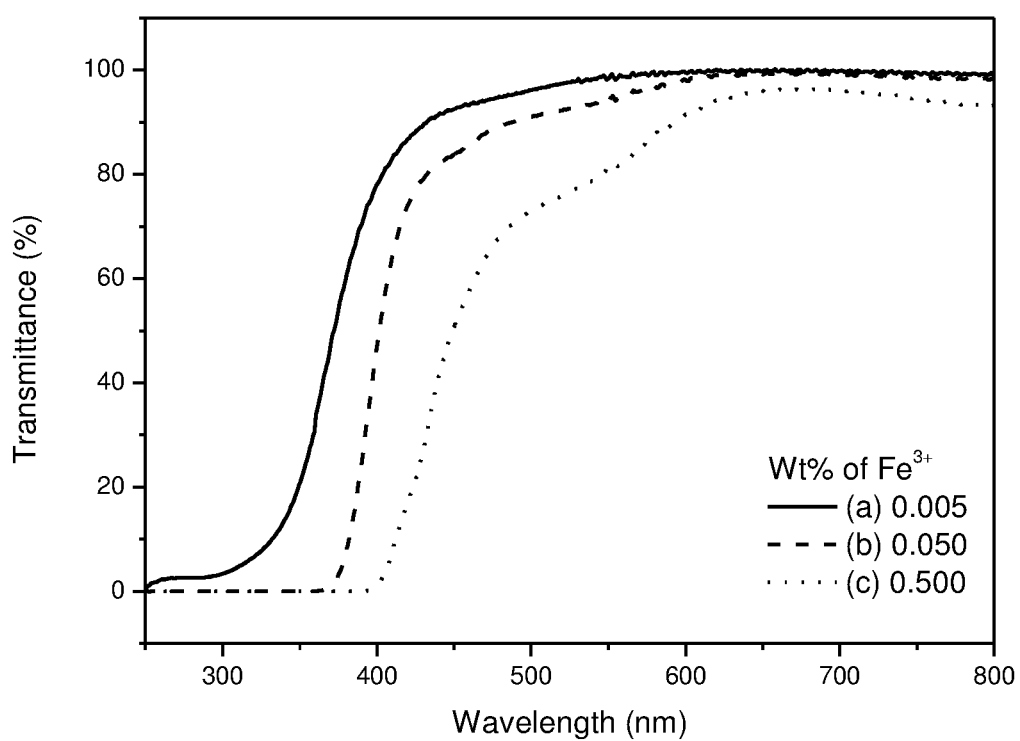
FIG. 8 shows UV-Vis spectra of ferric sulphate complex in $H_2O$. (a) 0.005 wt % $Fe^{3+}$; (b) 0.05 wt % $Fe^{3+}$; (c) 0.50 wt % of $Fe^{3+}$.
Figure 9:
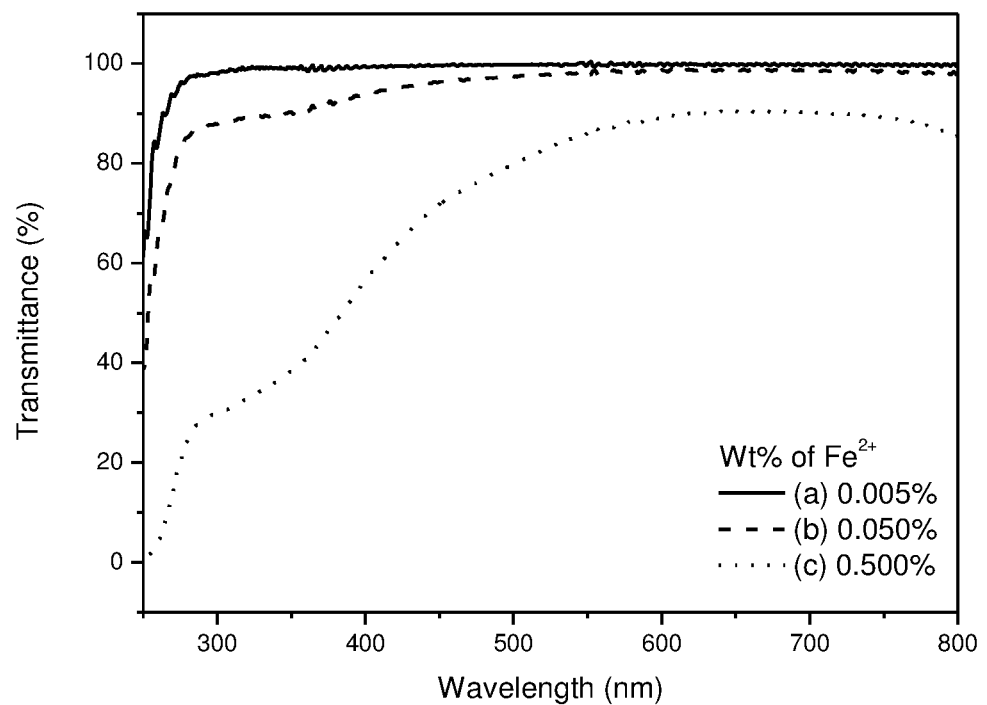
FIG. 9 shows UV-Vis spectra of ferrous sulphate complex in $H_2O$. (a) 0.005 wt % $Fe^{2+}$; (b) 0.05 wt % $Fe^{2+}$; (c) 0.50 wt % of $Fe^{2+}$.

UV blocking properties originate from the ferric ions. For comparison and as control solutions, UV spectra were acquired for $FeCl_3$, $Fe_2(SO_4)_3$, and $FeSO_4$ (FIGS. 7-9). Apparent from the spectra, UV shielding properties are only present in $FeCl_3$ and $Fe_2(SO_4)_3$, which contain ferric ions but not in $FeSO_4$, which contains ferrous ions. In comparison to the ferric-organic acid complexes, $FeCl_3$ and $Fe_2(SO_4)_3$ required much higher concentrations of $Fe^{3+}$ to achieve the same efficiency as the former. In addition, transparency in the visible range is depressed at these higher $Fe^{3+}$ concentrations. Although the UV blocking properties are derived from the ferric ions, organic acid ligands serve to improve the efficiency of UV absorbance and transparency in visible range.

Isolated solid samples of the ferric complexes were obtained via freeze drying. Thermal decomposition temperatures were analysed for the complexes. Thermal decomposition temperatures (Td) were determined at 98 wt % and were found to be low for all compounds. Potassium ferric oxalate (Td=88.5° C.), sodium ferric citrate (Td=83.5° C.), ferric citrate (Td=74.6° C.), ferric tartrate (Td=64.6° C.), ferric malonate (Td=108.7° C.), and ferric glycolate (Td=57.2° C.). However, these low thermal decomposition temperatures do not detract from their potential applications in coatings.

Figure 10:
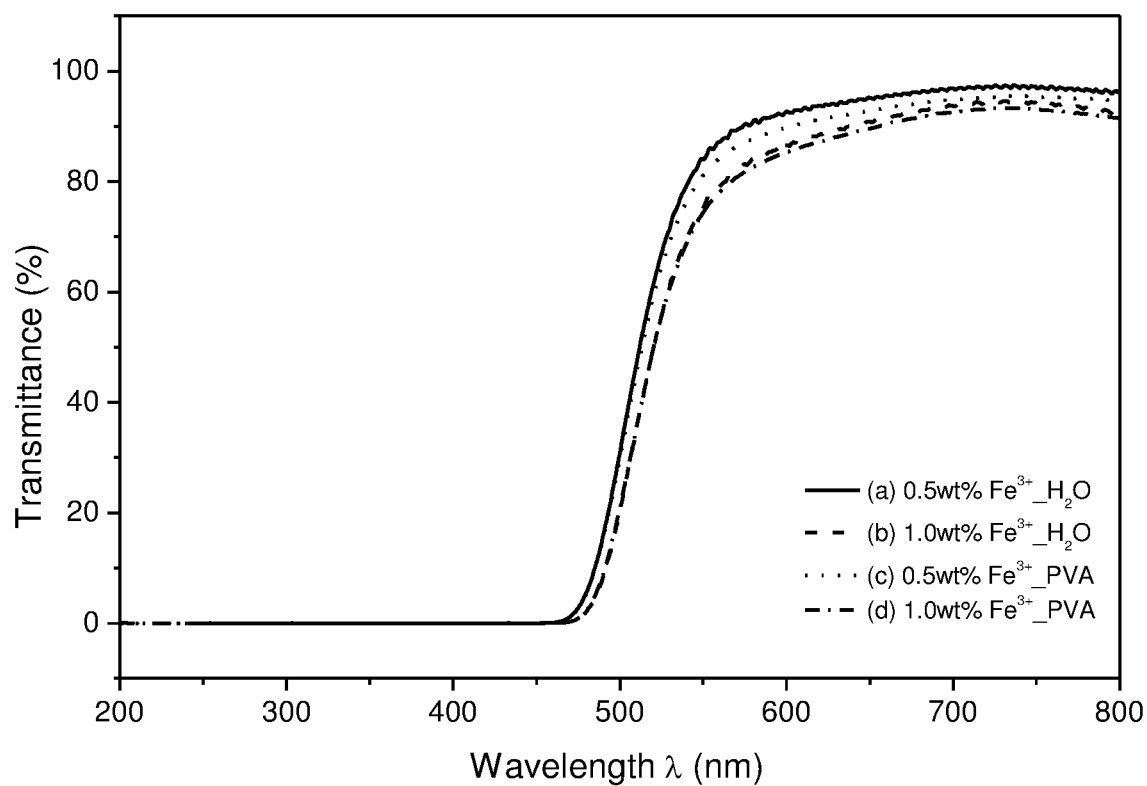
FIG. 10 shows UV-Vis spectra of ferric (III) citrate complex in $H_2O$ and PVA solutions. (a) 0.5 wt % $Fe^{3+}$_$H_2O$; (b) 1.0 wt % $Fe^{3+}$_$H_2O$; (c) 0.50 wt % of $e^{3+}$_PVA and (d) 1.0 wt % $Fe^{3+}$_PVA.

One embodiment of the present invention is the preparation of a UV blocking film by using the aforementioned ferric compound solutions for practical application. A facile process for the preparation of ferric compound polymer coating solution comprises the step of a blend of prepared ferric compound, homogeneously mixed with polymer to thereby form a coating layer on a plastic film via blade coating. The polymer added to the ferric compound may comprise of polymer with at least a hydroxyl functional group. The polymer may be selected from the group consisting of polyvinyl alcohol polymer and its derivatives, preferably partially hydrolyzed polyvinyl acetate polymer. The amount of polymer in the coating solution may be in the range of 3-10% w/v, more preferably in the range of 4-6% w/v. As depicted in FIG. 10, polyvinyl alcohol polymer does not have any effect on the UV blocking performance of ferric compound in aqueous solution, with a slight or negligible reduction in transparency.

In the application, PET film was coated with 200 μm of said coating solution. In one embodiment, UV blocking performance of film is highly dependent on the thickness of coating layer. UV shielding at higher wavelength (>450 nm) can be achieved by increasing the thickness of coating layer. The total solid content percentage of coating solution may be in the range of 5-6 wt %. The coating solution is applied onto a surface of a plastic film via blade coating using a film applicator to form a layer thereon. A bilayer structure of ferric compound_PVA/PET is obtained. The coated layer is then dried by air flash at room temperature, followed by vacuum drying at about 50° C. overnight. After drying, the thickness of the coated layer was controlled at about 10-12 μm. To further improve the sealing effect and water vapor barrier property of the coated UV blocking film, another layer of BOPP film was used for lamination. Ferric compound_PVA layer was laminated in between two plastic films. Another advantage of this design is to minimize direct contact of ferric compounds to the surfaces of produce packaged particularly for packaging application. In one embodiment, the heating step was undertaken when the said ferric compound_PVA/PET bilayer film is compressed together with said BOPP film to form a PET/ferric compound_PVA/BOPP trilayer film. The lamination temperature applied is about 120° C. at roll pressure of about 1-2 bars.

As demonstrated in FIG. 10 as an application example, ferric (III) citrate complex in the coating layer has efficiently shielded the ultraviolet light from 200-450 nm, with a maximum UV light blockage at 200-400 nm. It is important to highlight that this invention can effectively screen 99.2-99.99% of all ranges of ultraviolet light A-C from 400-100 nm. In addition, the ferric compound coated PET film with or without lamination allow light to pass through the film with high transparency>75% T. This is expected to find wide applications in coating industry. In one embodiment, 0.5 wt % $Fe^{3+}$ of ferric concentration with coating thickness of 10-12 μm is appropriate for producing the said UV blocking film with good UV shielding, high transparency and cost efficiency.

Figure 11:
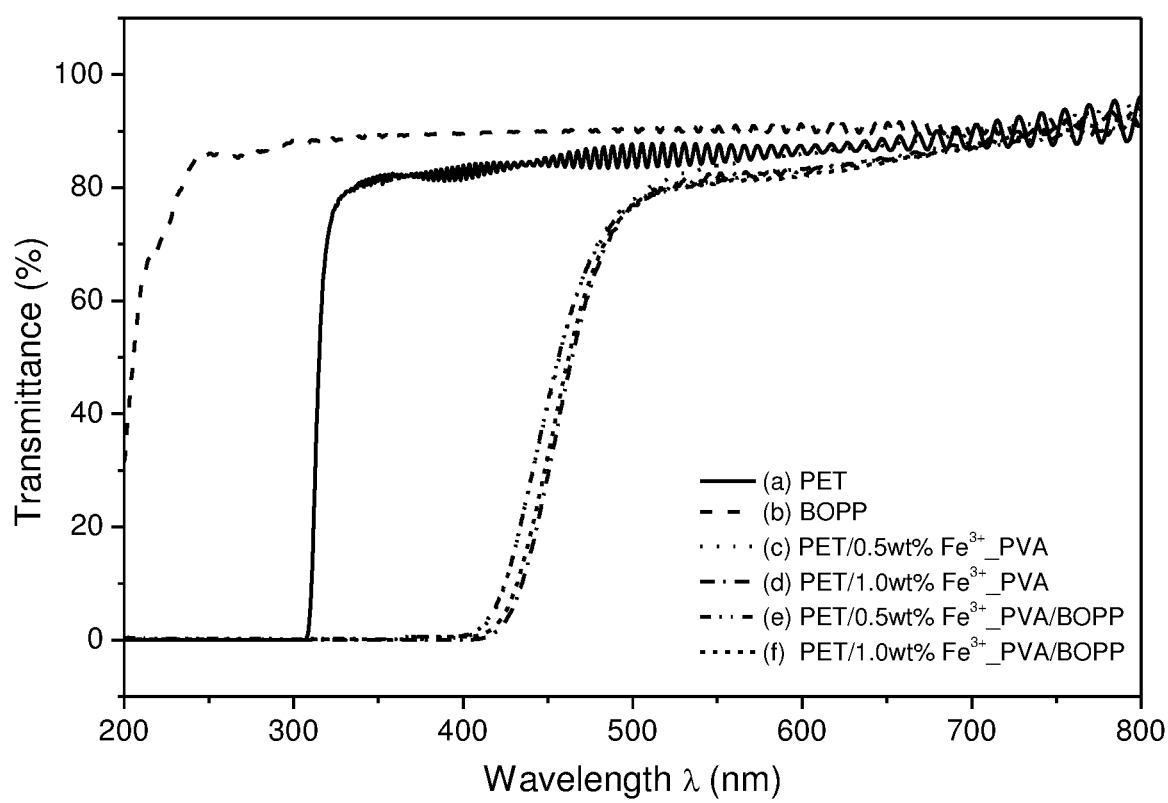
FIG. 11 shows UV-Vis spectra of (a) PET; (b) BOPP; (c) PET coated 0.5 wt % $Fe^{3+}$_PVA; (d) 1.0 wt % $Fe^{3+}$_PVA; (e) PET coated 0.5 wt % $Fe^{3+}$_PVA laminated with BOPP and (f) PET coated 1.0 wt % $Fe^{3+}$_PVA laminated with BOPP.

As demonstrated in FIG. 11 as an example, components of the article other than the metal complex (in this example BOPP and PET) do not contribute significantly to the UV blocking (traces (a) and (b)), particularly in the range 300 to 400 nm. In contrast, components comprising the metal complex (traces (c), (d), (e) and (f)) show the desired UV blocking effect up to 400 nm, whilst showing good transparency over 500 nm.

Another embodiment of the present invention, due to the presence of polyvinyl alcohol polymer as a barrier layer coated on the plastic film, the plastic film may prevent the permeation of gases and water vapor molecules to pass through the film. This will add value to the present invention, which primarily intended for UV blocking application. Low permeation rate of oxygen and water vapor through the coated layer may substantially protect the produces packaged from oxidation and thereby increase the shelf life. The ferric (III) citrate_PVA coated PET films showed good oxygen and water vapor barrier properties as demonstrated in Table 1. Oxygen and water vapor transmission rates were measured at 23° C. (0% RH) and 37.8° C. (90% RH), respectively, for a number of test films. The oxygen transmission rates of ferric compound_PVA coated PET films were significantly reduced in comparison to that of pure PET film. The laminated film also revealed good barrier property towards oxygen transmission. Meanwhile, ferric compound_PVA/PET films mildly reduced the water vapor transmission rate to about 30-50%. Lamination with BOPP film has shown great improvement by reducing the water vapor transmission rates to about 6 gm/[m²·day]. This is expected to expand applications of the as prepared film in diversified industrial fields.

TABLE 1

Oxygen and Water Vapor Transmission Rates of Tested Films

| Type of Film* | OTR (cc/[m² · day]) | WVTR (gm/[m² · day]) |
|---|---|---|
| PET | 129.89 | 46.49 |
| BOPP | 1712.07 | 6.89 |
| PET_PVA | 0.54 | 26.14 |
| PET-$Fe^{3+}$(0.5 wt %)_PVA | 2.42 | 22.43 |
| PET-$Fe^{3+}$(1.0 wt %)_PVA | 2.32 | 31.79 |
| PET-$Fe^{3+}$(0.5 wt %)_PVA@BOPP | 3.43 | 6.23 |
| PET-$Fe^{3+}$(1.0 wt %)_PVA@BOPP | 3.60 | 6.19 |

Synthesis Example 1

This example illustrates the procedure to prepare potassium ferric oxalate.

In a 25 mL glass sample vial, 1.73 g of oxalic acid was stirred in 2.0 mL of deionised water and heated to 60° C. In two separate vials, 1.24 g of ferric chloride hexahydrate and 1.54 g of potassium hydroxide was dissolved in 1 mL of deionised water, respectively. With continuous stirring at 60° C., ferric chloride hexahydrate solution and potassium hydroxide solution were both added to the oxalic acid mixture. Bright green solution was formed immediately. 13 mL of deionised water was added to the bright green solution to yield a concentration of 1.5 wt % of ferric ions. This stock solution was diluted for UV analysis. The sample vial was wrapped in aluminium foil to exclude light.

Solid powder for thermogravimetric analysis (TGA) measurements was prepared by heating to form a concentrated solution followed by allowing the concentrated solution to cool and crystallize. Crystals were filtered with a Buchner funnel and allowed to dry under atmospheric condition away from light.

Synthesis Example 2

This example illustrates the procedure to prepare ferric citrate.

In a 25 mL glass sample vial, 1.54 g of citric acid was stirred in 2.0 mL of deionised water at room temperature. In a separate vial, 1.08 g of ferric chloride hexahydrate was dissolved in 2.0 mL of deionised water. With continuous stirring, ferric chloride hexahydrate solution was added to the citric acid mixture. Bright yellow solution was formed immediately. 18 mL of deionised water was added to the solution to yield a concentration of 1.0 wt % of ferric ions. This stock solution was used to prepare the films and separately diluted for UV analysis.

The solution was evaporated to form a concentrated solution before freezing at −80° C. overnight and freeze drying for three nights. The solid powder obtained was used for thermogravimetric analysis (TGA) measurements.

Synthesis Example 3

This example illustrates the procedure to prepare sodium ferric citrate.

In a 25 mL glass sample vial, 2.35 g of sodium citrate was stirred in 4.0 mL of deionised water at room temperature. In a separate vial, 1.08 g of ferric chloride hexahydrate was dissolved in 2.0 mL of deionised water. With continuous stirring, ferric chloride hexahydrate solution was added to the sodium citrate mixture. Dark green solution was formed immediately.

The solution was evaporated to form a concentrated solution before freezing at −80° C. overnight and freeze drying for three nights. The solid powder obtained was used for TGA measurements.

The solid sample was weighed and made to concentrations of 1.0 wt %, 0.1 wt % and 0.01 wt % of ferric ions. Serial dilution was done to obtain concentrations between these values.

Synthesis Examples 4-6

The procedure in synthesis example 3 was repeated to produce solutions of ferric tartrate, ferric malonate and ferric glycolate. The mass of the respective acids used are indicated in the following Table 2.

TABLE 2

Mass of respective acids used in synthesis of ferric - organic acid complexes

| Example | Ferric Complex | Organic Acid | Mass of Organic Acid Used (g) | Appearance |
|---|---|---|---|---|
| 4 | Ferric tartrate | Tartaric acid | 1.80 | Yellow |
| 5 | Ferric malonate | Malonic acid | 1.72 | Yellow |
| 6 | Ferric glycoalte | Glycolic acid | 1.71 | Yellow |

Ferric glycolate did not form solids upon freeze drying, but formed a dark yellow brown viscous oil.

Preparation Example 1

Preparation of Poly(Vinyl Alcohol) (PVA) Solution 10 g of PVA (CAS-number 9002-89-5, 1000 repeating units, partially hydrolyzed PVA obtained from Wako Chemicals USA, Inc of Richmond, Va. of the United States of America) was fully dissolved in 100 ml of deionized water under stirring at 100° C.

Preparation Example 2

Preparation of Ferric (III) Citrate_PVA Solution

Appropriate amount of ferric (III) citrate complex obtained from Synthesis Example 2 was added dropwise into 5 ml of PVA solution obtained from Preparation Example 1 to obtain 0.5-1.0 wt % of $Fe^{3+}$ solution. The concentration of PVA is maintained at 5% w/v. The mixture was then physically mixed under magnetic stirring at room temperature for 8 hours.

Preparation Example 3

Preparation of Ferric (III) Citrate_PVA Film

Ferric (III) citrate_PVA coating solution obtained from Preparation Example 2 was blade coated onto a PET film by using a film applicator with an applicator bar coating gap controlled at 200 μm. The applied layer was then dried by air flash at room temperature overnight, followed by vacuum oven dried at 50° C. overnight. For laminated film, the coated PET film and blank BOPP film were compressed together by using a laminator at 120° C. and 2 bars.

Test Methods

UV-Visible Transmission

UV-Visible spectra of aqueous solutions of the five $Fe^{3+}$-organic acid complexes and the controls were recorded with Shimadzu UV-Vis-NIR scanning spectrophotometer UV-3101PC. The measurement was conducted for 0.01-1.00 wt % of $Fe^{3+}$, using deionised water as the reference, in 1 cm×1 cm disposable plastic cuvettes in the range of 250 nm-800 nm at room temperature.

UV-visible transmission of the ferric (III) citrate_PVA solution and the said solution coated plastic films with or without lamination were measured using Shimadzu UV-2501PC, UV-Vis Recording Spectrophotometer. The measurement was conducted by using deionized water and air as reference for solution and plastic film, respectively, at room temperature in the range of 200-800 nm.

Thermogravimetric Analysis

The thermal stabilities were measured with TGA Q500, TA instruments. Each sample with a mass of 10-20 mg was placed in an alumina pan and heated 10° C. per minute from room temperature to 850° C. under nitrogen.

Oxygen Transmission Rate

Oxygen permeability of ferric (III) citrate_PVA coated PET film was measured by using Mocon oxygen permeability OX-TRAN® Model 2/21 according to ASTM D3985. Each film was placed on a stainless steel mask with an open testing area of 5 cm2. Oxygen permeability measurements were conducted at 23° C. (1 atm) and 0% relative humidity by placing coated surface of films to the oxygen rich side. Similar experimental conditions were applied for the said coated PET film laminated with BOPP film.

Water Vapor Transmission Rate

Water vapor permeability of ferric (III) citrate_PVA coated PET film was measured by using Mocon water vapor permeability PERMATRAN-W® Model 3/33 according to ASTM F1249. Each film was placed on a stainless steel mask with an open testing area of 5 $cm^2$. Water vapor permeability measurements were conducted at 37.8° C. (1 atm) and 90% relative humidity by placing coated surface of films to the water vapor rich side. Similar experimental conditions were applied for the said coated PET film laminated with BOPP film.

Further properties and examples of the present invention include the following aspects:

Ferric-polyacid complexes are a new group of materials that are found very efficient to block the full wavelength range of UVA, UVB and UVC. The strong coordination effect of the multi-dentate ligand not only provides excellent stability of the compounds, but also enables easy incorporation of such compounds into matrixes of choice to form UV-blocking composite films or coatings.

1) Ferric complexes that can be incorporated homogeneously in a medium that includes but is not limited to water, aqueous solution of other compounds, organic solvent, organic solution of other compounds, polymers, polymer composites etc, to provide the function of UV blocking;
2) An ultraviolet absorbing aqueous solution comprising of $Fe^{3+}$ and organic acid ligand, wherein the said organic acid ligand is selected from the group consisting of
    (i) more than one coordination site
    (ii) second coordination site could be another carboxylic acid group, hydroxyl group or other functional groups that could coordinate with $Fe^{3+}$
3) The solution as described above, with concentrations of 0.001-1.000 wt % of $Fe^{3+}$, absorbs 80-100% of UV radiation in the range of 200-400 nm.
4) The solution as described above, with concentrations of 0.001-1.000 wt %, which provides more than 80% transparency in visible light in the range of 400-800 nm.

5) An ultraviolet absorbing coating solution comprising of the solution described above in a polymer, wherein the said polymer is selected from the group consisting of
    (i) at least a hydroxyl functional group
    (ii) polyvinyl alcohol polymer and derivatives
6) The coating solution of above, with concentration of polymer in the range of 3-10% w/v, absorbs 80-100% of UV radiation in the range of 200-400 nm.
7) The coating solution of above, which provides more than 80% transparency in visible light in the range of 400-800 nm.
8) An ultraviolet absorbing film of polyethylene terephthalate coated with 5-6 wt % of the coating solution as described above.
9) The film of described above which absorbs 90-100% of UV radiation in the range of 200-400 nm.
10) The film of described above which provides more than 75% transparency in visible light in the range of 400-800 nm.
11) An ultraviolet absorbing laminate of biaxially oriented polypropylene and the film described above without the use of adhesive.
12) The laminate of described above which absorbs 90-100% of UV radiation in the range of 200-400 nm.
13) The laminate of described above which provides more than 75% transparency in visible light in the range of 400-800 nm.
14) The laminate of described above which provides oxygen and water vapor barrier properties of less than 3.60 cc/m$^2$·day and 6.50 g/m$^2$·day, respectively.

The invention claimed is:

1. A coating composition comprising
    (a) an iron complex comprising a carboxylic acid or anion thereof coordinated to an iron ion; and
    (b) a water-soluble polymer,
    wherein there is no covalent bond between said iron complex and the polymer;
    wherein the ratio of polymer to the iron is in a range of 40:1 to 2:1 by weight;
    wherein the iron content of the composition is in a range of 0.0005 wt % to 2.0 wt %, and
    wherein the carboxylic acid, or anion thereof, comprises a thiol group as a second functional group coordinated with the iron ion.

2. The coating composition of claim 1, wherein the oxidation state of the iron is 2+ or 3+.

3. The coating composition of claim 1, wherein the polymer is selected from the group consisting of polyvinyl alcohol, a partially hydrolyzed polyvinyl alcohol ester and any derivatives and copolymers thereof.

4. The coating composition of claim 1, wherein the iron complex and the polymer are both in solution in a solvent, optionally wherein the solvent is aqueous.

5. The coating composition of claim 1, wherein the transmission of UVA, UVB and UVC radiation is at least 90% blocked by a thickness of 10 microns of said composition, optionally by a thickness of 5 microns or of 1 micron thereof.

6. The coating composition of claim 1, wherein at least 70% of visible light in a range of 500 nm to 700 nm is transmitted through a thickness of 10 microns of said composition, optionally by a thickness of 5 microns or of 1 micron thereof.

7. The coating composition of claim 1, wherein the oxygen transmission rate of the coating composition is less than 10 cc/[m$^2$·day], or wherein the water vapor transmission rate of the coating composition is less than 10 g/[m$^2$·day].

8. The coating composition of claim 1, wherein the iron content of the composition is in a range of 0.0005 wt % to 1.5 wt %.

9. An article comprising:
    (a) a substrate; and
    (b) a coating composition of claim 1 in the form of a layer on a surface of said substrate;
    wherein said coating composition layer contains less than about 1% w/v solvent.

10. The article of claim 9, wherein the coating composition layer has a thickness in a range of 1 μm to 250 μm, optionally in a range of 1 μm to 10 μm.

11. The article of claim 9, wherein the substrate is selected from materials in the group consisting of polymer, glass, wood, silicon, metal, metal alloy and any mixture thereof.

12. The article of claim 9, further comprising a laminate layer bonded to the coating composition layer whereby the coating composition layer is disposed between the substrate and the laminate layer.

13. The article of claim 12, wherein the laminate layer comprises a material selected from the group consisting of polymer, glass, and any mixture thereof.

14. The article of claim 13, wherein the laminate layer comprises polypropylene.

15. The article of claim 9, wherein the layer is substantially non-toxic or has no toxic extractables.

16. A process for making an article according to claim 9, comprising a step of applying the coating composition to a surface of the substrate.

17. The process of claim 16, further comprising a step of drying the coating composition after said applying, wherein the drying comprises air flash drying at room temperature.

18. The process of claim 16, further comprising the step of laminating the article with a laminate layer after said applying.

19. An article made by the process of claim 16.

20. A process for making a coating composition of claim 1, comprising:
    combining a solution of an iron complex with a solution of a water-soluble polymer, wherein said iron complex comprises a carboxylic acid or anion thereof coordinated to an iron ion and wherein said iron complex does not bond covalently to said polymer, wherein the ratio of polymer to the iron is in a range of 40:1 to 2:1 by weight, wherein the iron content of the composition is in a range of 0.0005 wt % to 2.0 wt %, and wherein the carboxylic acid, or anion thereof, comprises a thiol group as a second functional group coordinated with the iron ion.

21. The process of claim 20, comprising: combining a solution of an iron ion with a solution of a carboxylic acid or salt thereof so as to produce the solution of the iron complex.

22. The process of claim 20, further comprising a step of drying the coating composition.

23. A coating composition made by the process of claim 20.

* * * * *